US012581412B2

(12) United States Patent
Ly et al.

(10) Patent No.: US 12,581,412 B2
(45) Date of Patent: Mar. 17, 2026

(54) DOWNLINK FREQUENCY BANDWIDTH RESTRICTION MANAGEMENT

(71) Applicant: QUALCOMM Incorporated, San Diego, CA (US)

(72) Inventors: Hung Dinh Ly, San Diego, CA (US); Yu Zhang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 18/066,011

(22) Filed: Dec. 14, 2022

(65) Prior Publication Data

US 2024/0064636 A1 Feb. 22, 2024

Related U.S. Application Data

(60) Provisional application No. 63/373,120, filed on Aug. 22, 2022.

(51) Int. Cl.
| | |
|---|---|
| *H04W 72/04* | (2023.01) |
| *H04W 24/10* | (2009.01) |
| *H04W 52/02* | (2009.01) |
| *H04W 72/1273* | (2023.01) |

(52) U.S. Cl.
CPC ....... *H04W 52/0229* (2013.01); *H04W 24/10* (2013.01); *H04W 72/1273* (2013.01)

(58) Field of Classification Search
CPC ......... H04W 52/0229; H04W 52/0216; H04W 24/10; H04W 72/1273; H04W 72/23; H04L 5/001; H04L 5/0098; H04L 5/0053
See application file for complete search history.

(56) References Cited

U.S. PATENT DOCUMENTS

| | | | |
|---|---|---|---|
| 11,838,903 B2 * | 12/2023 | Yao ................... | H04W 72/0453 |
| 2014/0254452 A1 * | 9/2014 | Golitschek Edler Von Elbwart ............ | H04W 52/0219 370/311 |
| 2019/0132830 A1 * | 5/2019 | Tabet .................... | H04W 72/21 |
| 2019/0215126 A1 * | 7/2019 | Choi ..................... | H04L 1/1671 |
| 2019/0296882 A1 * | 9/2019 | Li ...................... | H04W 28/0268 |
| 2021/0099898 A1 * | 4/2021 | You ........................ | H04W 24/08 |
| 2021/0176656 A1 * | 6/2021 | Sang ................... | H04W 36/302 |
| 2024/0195572 A1 * | 6/2024 | Niu ......................... | H04L 5/0094 |
| 2025/0007669 A1 * | 1/2025 | Li ............................ | H04L 5/00 |
| 2025/0047454 A1 * | 2/2025 | Jung .................... | H04L 5/0094 |

* cited by examiner

*Primary Examiner* — Mahbubul Bar Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may receive a first indication to use, for a first wireless communication, an active downlink (DL) bandwidth part (BWP). The UE may receive a second indication to use, for a second wireless communication, a restricted DL bandwidth (BW) that is based at least in part on the active DL BWP. Numerous other aspects are described.

30 Claims, 10 Drawing Sheets

Network Node
110

UE
120

610
Active DL BWP indication

620
UE-specific PDCCH configuration

630
Communicate using the active DL BWP

640

650
Activate restricted DL BW

Determine a restricted
DL BW configuration
660

670
Communicate using the restricted DL BW

690

Validate Resource
680

600

700

710   Receive a first indication to use, for a first wireless communication, an active downlink (DL) bandwidth part (BWP)

720   Receive a second indication to use, for a second wireless communication, a restricted DL bandwidth (BW) that is based at least in part on the active DL BWP 810 — Transmit a first indication to use, for a first wireless communication associated with a user equipment (UE), an active downlink (DL) bandwidth part (BWP)

820 — Transmit a second indication to use, for a second wireless communication associated with the UE, a restricted DL bandwidth (BW) that is based at least in part on the active DL BWP

800

DOWNLINK FREQUENCY BANDWIDTH RESTRICTION MANAGEMENT

CROSS-REFERENCE TO RELATED APPLICATION

This Patent application claims priority to U.S. Provisional Patent Application No. 63/373,120, filed on Aug. 22, 2022, entitled "DOWNLINK FREQUENCY BANDWIDTH RESTRICTION MANAGEMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for downlink frequency bandwidth restriction management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first indication to use, for a first wireless communication, an active downlink (DL) bandwidth part (BWP). The method may include receiving a second indication to use, for a second wireless communication, a restricted DL bandwidth (BW) that is based at least in part on the active DL BWP.

Some aspects described herein relate to a method of wireless communication performed by a network node. The method may include transmitting a first indication to use, for a first wireless communication associated with a UE, an active DL BWP. The method may include transmitting a second indication to use, for a second wireless communication associated with the UE, a restricted DL BW that is based at least in part on the active DL BWP.

Some aspects described herein relate to a UE. The UE may include a memory and one or more processors coupled to the memory. The one or more processors may be configured to receive a first indication to use, for a first wireless communication, an active DL BWP. The one or more processors may be configured to receive a second indication to use, for a second wireless communication, a restricted DL BW that is based at least in part on the active DL BWP.

Some aspects described herein relate to a network node. The network node may include a memory and one or more processors coupled to the memory. The one or more processors may be configured to transmit a first indication to use, for a first wireless communication associated with a UE, an active DL BWP. The one or more processors may be configured to transmit a second indication to use, for a second wireless communication associated with the UE, a restricted DL BW that is based at least in part on the active DL BWP.

Some aspects described herein relate to a non-transitory computer-readable medium that stores a set of instructions by a UE. The set of instructions, when executed by one or more processors of the UE, may cause the UE to receive a first indication to use, for a first wireless communication, an active DL BWP. The set of instructions, when executed by one or more processors of the UE, may cause the UE to receive a second indication to use, for a second wireless communication, a restricted DL BW that is based at least in part on the active DL BWP.

Some aspects described herein relate to a non-transitory computer-readable medium that stores a set of instructions by a network node. The set of instructions, when executed by one or more processors of the network node, may cause the network node to transmit a first indication to use, for a first wireless communication associated with a UE, an active DL BWP. The set of instructions, when executed by one or more processors of the network node, may cause the network node to transmit a second indication to use, for a second wireless communication associated with the UE, a restricted DL BW that is based at least in part on the active DL BWP.

Some aspects described herein relate to an apparatus. The apparatus may include means for receiving a first indication to use, for a first wireless communication, an active DL BWP. The apparatus may include means for receiving a second indication to use, for a second wireless communication, a restricted DL BW that is based at least in part on the active DL BWP.

Some aspects described herein relate to an apparatus. The apparatus may include means for transmitting a first indication to use, for a first wireless communication associated with a UE, an active DL BWP. The apparatus may include means for transmitting a second indication to use, for a second wireless communication associated with the UE, a restricted DL BW that is based at least in part on the active DL BWP.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
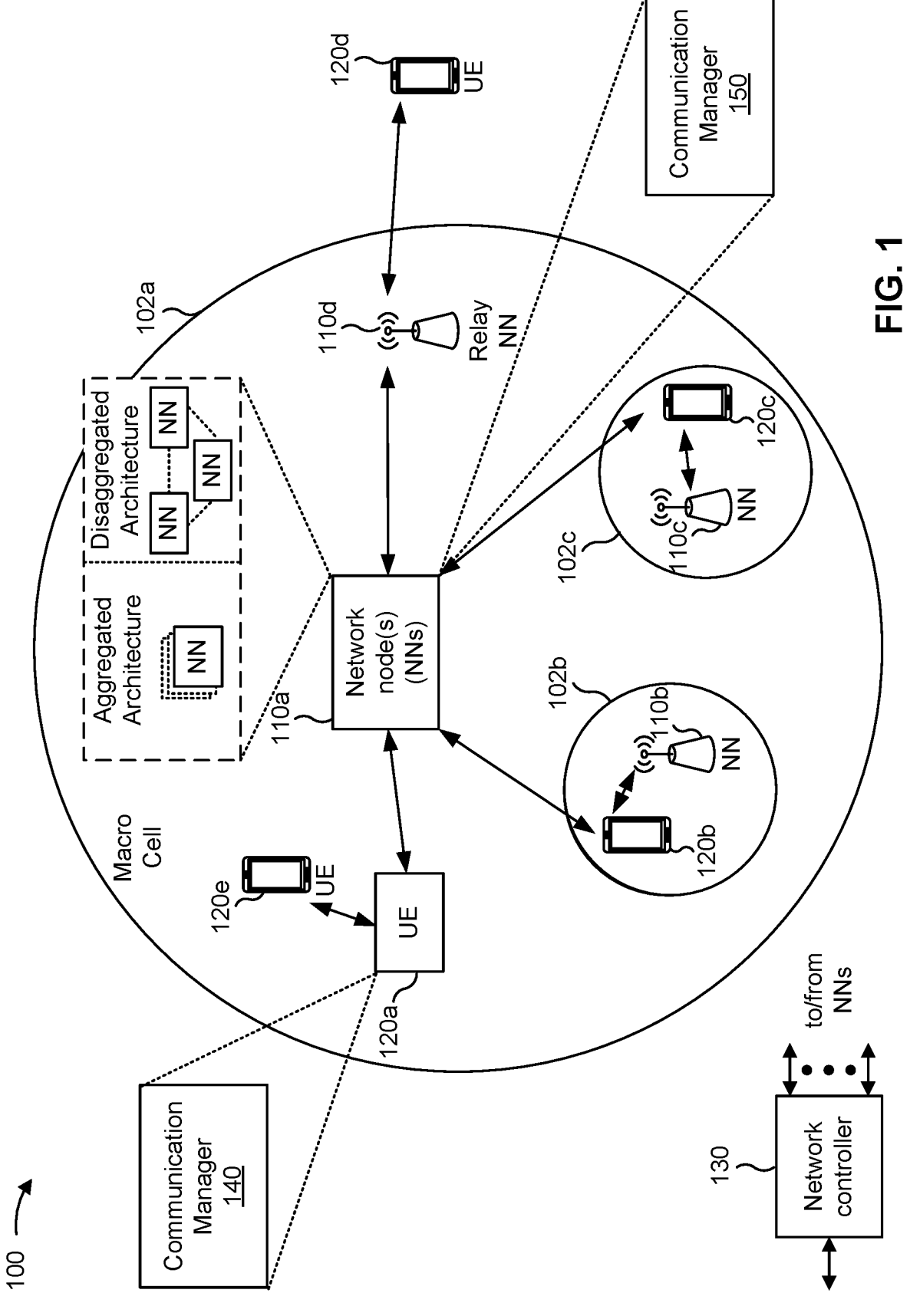
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive a first indication to use, for a first wireless communication, an active downlink (DL) bandwidth part (BWP); and receive a second indication to use, for a second wireless communication, a restricted DL bandwidth (BW) that is based at least in part on the active DL BWP. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit a first indication to use, for a first wireless communication associated with a UE, an active DL BWP; and transmit a second indication to use, for a second wireless communication associated with the UE, a restricted DL BW that is based at least in part on the active DL BWP. Additionally, or alternatively, the communication manager 150 may perform one or more other operations described herein.

As indicated above, FIG. 1 is provided as an example. Other examples may differ from what is described with regard to FIG. 1.

Figure 2:
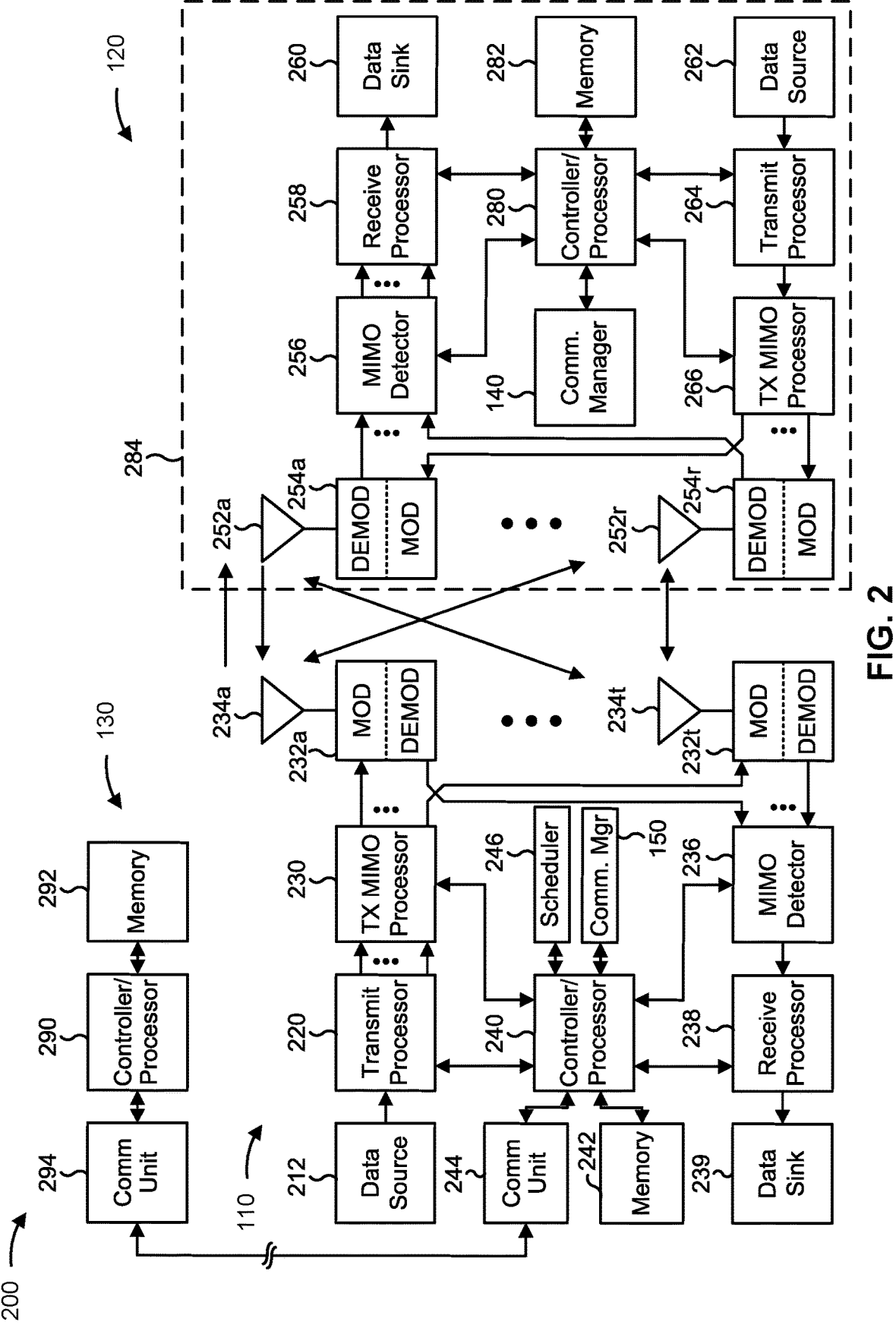
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with downlink frequency bandwidth restriction management, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a first indication to use, for a first wireless communication, an active DL BWP; and/or means for receiving a second indication to use, for a second wireless communication, a restricted DL BW that is based at least in part on the active DL BWP. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a first indication to use, for a first wireless communication associated with a UE, an active DL BWP; and/or means for transmitting a second indication to use, for a second wireless communication associated with the UE, a restricted DL BW that is based at least in part on the active DL BWP. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
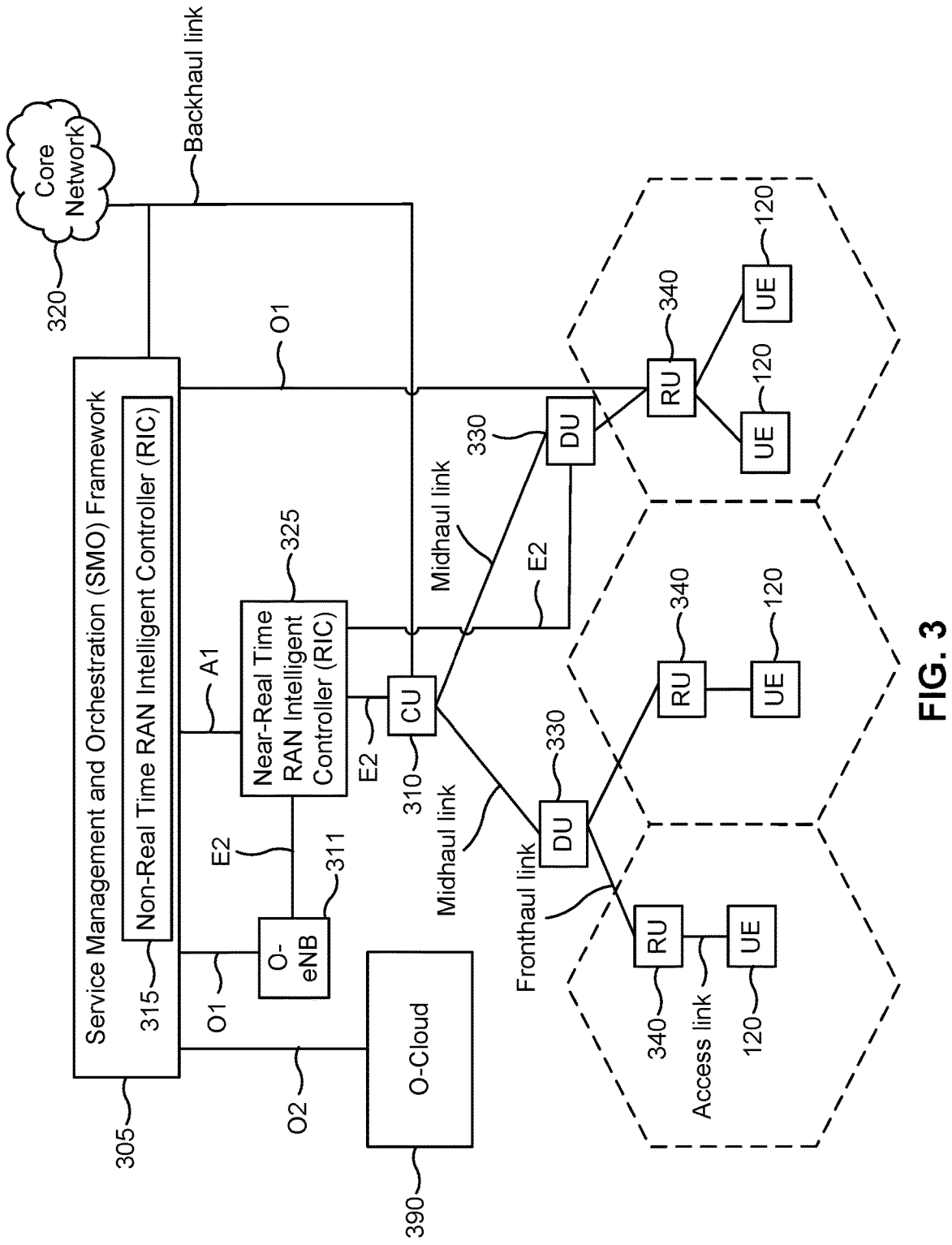
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
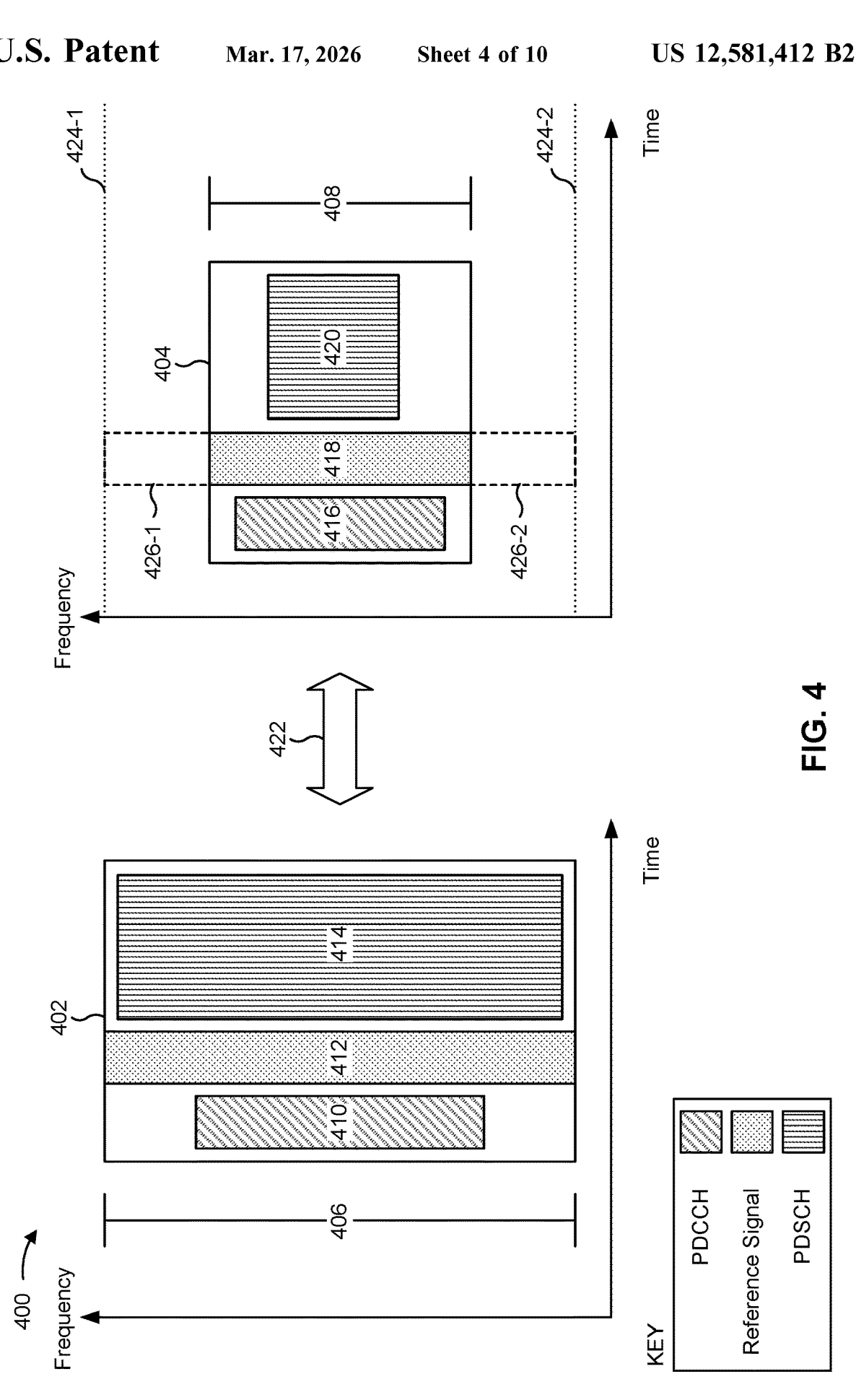
FIG. 4 is a diagram illustrating an example of switching between a first bandwidth part (BWP) and a second BWP, in accordance with the present disclosure.

FIG. 4 is a diagram illustrating an example 400 of switching between a first BWP and a second BWP, in accordance with the present disclosure.

A carrier may be associated with a set of resource blocks (RBs). Each RB may include a group of resource elements (REs) that are characterized by a frequency partition and a time partition. Accordingly, the set of RBs associated with the carrier may span a bandwidth and time duration. A "bandwidth part" may denote a subset of contiguous RBs within the set, and a carrier may be partitioned into multiple BWPs (e.g., four). The ability to partition the carrier into BWPs (e.g., by way of partitioning the set of RBs) may provide flexibility and efficient usage of the bandwidth associated with the carrier. To illustrate, a first BWP associated with a carrier may be configured differently from a second BWP associated with the carrier based at least in part on a variety of factors, such as UE power requirements, data throughput, and/or spectrum usage. For example, the first BWP may be configured with a larger bandwidth relative to the second BWP based at least in part on the first BWP being used for a higher data throughput relative to the second BWP. The second BWP may be configured with a smaller bandwidth relative to the first BWP based at least in part on reducing a transmission size and/or processing associated with the transmission to reduce power consumption at a UE.

In some aspects, only a single BWP of the multiple BWPs may be active per transmission direction at a given time, such as a single active BWP for uplink (UL) transmissions and a single active BWP for DL transmissions. Accordingly, a network node (e.g., the network node 110) may direct a UE (e.g., the UE 120) to switch from using a first BWP as an active BWP to using a second BWP as the active BWP. To illustrate, the UE may utilize an initial BWP when operating in a radio resource control idle (RRC_IDLE) mode and switch to a different BWP when operating in a radio resource control connected (RRC_CONNECTED) mode. That is, the UE may communicate with the network node by initially using the initial BWP as the active BWP and then switch to using the different BWP as the active BWP.

The example 400 includes a first BWP 402 associated with a carrier and a second BWP 404 associated with the same carrier. As shown by the example 400, each BWP may be characterized based at least in part on time (shown on a horizontal axis) and frequency (shown on a vertical axis). In some aspects, the first BWP 402 and the second BWP 404 are each associated with DL communications and, accordingly, simultaneous activation of the first BWP 402 and the second BWP 404 may be disallowed. The first BWP 402 may be associated with a first bandwidth 406 and the second BWP 404 may be associated with a second bandwidth 408 that spans fewer RBs relative to the first bandwidth 406. In some aspects, the network node may configure the first BWP 402 for high volume data traffic (e.g., data traffic that satisfies a high volume threshold) and the second BWP 404 for low volume data traffic (e.g., data traffic that fails to satisfy the high volume threshold) at least by configuring the first BWP 402 with a wider bandwidth relative to the second BWP 404.

For some transmissions, the network node may dynamically adapt frequency resources used for the transmission (e.g., without switching BWPs). For example, the network node may adjust a bandwidth of a physical downlink control channel (PDCCH) transmission and/or a bandwidth of a physical downlink shared channel (PDSCH) transmission without switching BWPs. However, for some transmissions, such as a non-zero power (NZP) channel state information reference signal (CSI-RS), and/or a tracking reference signal (TRS), the network node may be disallowed from adjusting a bandwidth. That is, the network node may be required to use an entire bandwidth of an active BWP (and/or a fixed bandwidth that is based at least in part on a bandwidth associated with the active BWP) when transmitting a reference signal (e.g., the NZP CSI-RS and/or the TRS).

To illustrate, the network node may transmit each of a PDCCH 410, a reference signal 412 (e.g., a CSI-RS or a TRS), and a PDSCH 414 based at least in part on the first bandwidth 406 when the first BWP 402 is the active BWP. The network node may transmit the reference signal 412 based at least in part on using an entirety of the first bandwidth 406 (and/or a fixed bandwidth) and transmit the PDCCH 410 and/or the PDSCH 414 based at least in part on using an adjustable bandwidth. When the second BWP 404 is the active BWP, the network node may transmit PDCCH 416, reference signal 418, and PDSCH 420 based at least in part on the (smaller) second bandwidth 408. For example, the network node may adjust a transmission bandwidth associated with PDCCH 416, the reference signal 418, and the PDSCH 420. As shown by the example 400, the network node may use an entirety of the bandwidth 408 (and/or a fixed bandwidth) to transmit the reference signal 418. The network node may switch active BWPs and/or direct the UE to switch active BWPs as shown by reference number 422, such as through radio resource control (RRC) signaling, downlink control information (DCI) scheduling, and/or a medium access control (MAC) control element (CE).

As further described above, without switching active BWPs, the network node may be required to transmit the reference signal 418 based at least in part on a bandwidth of an active BWP. To illustrate, lines 424-1 and 424-2 (shown as dotted lines) provide a reference to the bandwidth 406 associated with the first BWP 402. Without switching active BWPs from the first BWP 402 to the second BWP 404, the network node may adjust a bandwidth size for a PDCCH transmission and a PDSCH transmission as shown by the PDCCH 416 and the PDSCH 420. That is, the network node may transmit the PDCCH 416 and the PDSCH 420 based at least in part on using the first BWP 402 as the active BWP. However, if the first BWP 402 is the active BWP, the network node may be required to transmit the reference signal 418 based at least in part on the first bandwidth 406. To illustrate, a bandwidth associated with the reference signal 418 may span the first bandwidth 406, as shown by reference number 426-1 and reference number 426-2. Thus, to reduce a bandwidth associated with transmitting a reference signal, and help mitigate power consumption at a UE, the network node may be required to switch active BWPs.

Switching between active BWPs may increase overhead at a UE and/or introduce delays in the wireless communications, such as when the UE is instructed to switch between BWPs frequently. For example, the UE may retune radio frequency (RF) hardware and/or reconfigure system parameters when switching active BWPs, resulting in delays that are based at least in part on hardware settling and/or the system updating to the new parameters. In some aspects, PDSCH and/or physical uplink shared channel (PUSCH) repetitions may be interrupted and/or dropped while switching active BWPs and result in retransmissions. Alternatively or additionally, a hybrid automatic repeat request (HARD) acknowledgement may be interrupted and result in unnecessary retransmissions. As yet another example, a configured grant (e.g., semi-persistent scheduling associated with PDSCH and/or a Type 2 configured grant associated with PUSCH) may be deactivated, cleared out, and/or reactivated while switching active BWPs and result in additional transmissions between the network node and UE. Accordingly, switching between active BWPs may consume air interface resources (e.g., frequency and/or time resources) that could be used for other devices operating in the wireless network, and result in reduced data throughput and/or increased data-transfer latencies.

Some techniques and apparatuses described herein provide for DL frequency bandwidth restriction management. In some aspects, a UE may receive a first indication to use, for a first wireless communication, an active DL BWP, such as an indication to use the first BWP 402 for one or more DL communications. In some aspects, the first indication may include a communication that configures the active DL BWP (e.g., a BWP index and/or an indication of one or more resources associated with the active DL BWP). After receiving the first indication, the UE may receive a second indication to use, for a second wireless communication, a restricted DL BW that is based at least in part on the active DL BWP. As one example, the restricted DL BW may be based at least in part on a subset of resources associated with the active DL BWP. The second indication may indicate to activate the restricted DL BW. "Activating a restricted BW" may denote transmitting and/or receiving transmissions based at least in part on a bandwidth associated with the restricted BW. "Deactivating a restricted BW" may denote ceasing to transmit and/or receive transmissions based at least in part on the bandwidth associated with the restricted BW.

In some aspects, a network node may transmit a first indication to use, for a first wireless communication associated with a UE, an active DL BWP, such as a BWP index indication associated with the DL BWP and/or a resource indication that specifies one or more resources associated with the active DL BWP. After transmitting the first indication, the network node may transmit a second indication to use, for a second wireless communication associated with the UE, a restricted DL BW that is based at least in part on the active DL BWP (e.g., a subset of resources associated with the active DL BWP).

By activating a restricted BW, a network node may reduce energy consumption at a UE by reducing a bandwidth that the UE uses for receiving and/or processing DL communications. For example, a reduced bandwidth may reduce a number of signal samples processed by the UE. Accordingly, the network node may activate a restricted bandwidth based at least in part on determining to operate in a network energy saving mode. In some aspects, the network node may activate a restricted BW using fewer air interface resources relative to switching active BWPs, such as by mitigating semi-persistent scheduling (SPS) reconfiguration and/or HARQ reconfiguration. Alternatively or additionally, the UE may activate the restricted BW with less hardware reconfiguration relative to switching active BWPs and subsequently reduce a hardware settling delay time. To illustrate, the UE may refrain from retuning a receiver and/or a transmitter. Mitigating SPS reconfiguration and/or HARQ reconfiguration, using fewer air interface resources, and/or mitigating hardware settling delay times may reduce data transfer latencies and/or increase data throughput relative to switching active BWPs.

As indicated above, FIG. 4 is provided as an example. Other examples may differ from what is described with regard to FIG. 4.

Figure 5:
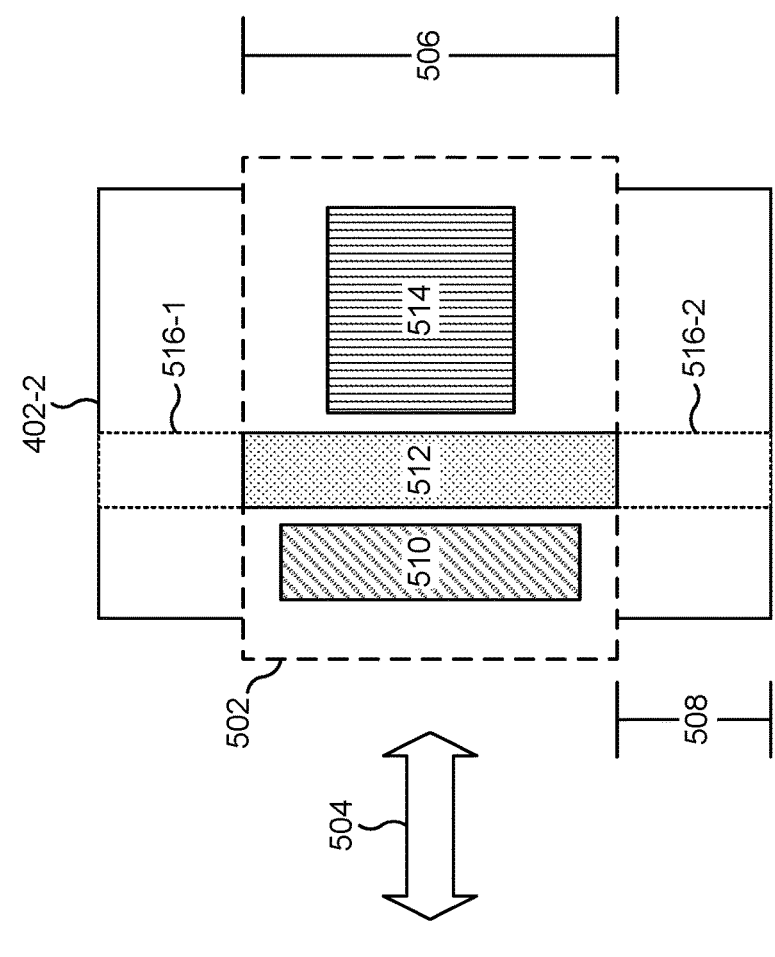
FIG. 5 is a diagram illustrating an example of a restricted bandwidth that is based at least in part on an active BWP, in accordance with the present disclosure.
Figure 5:
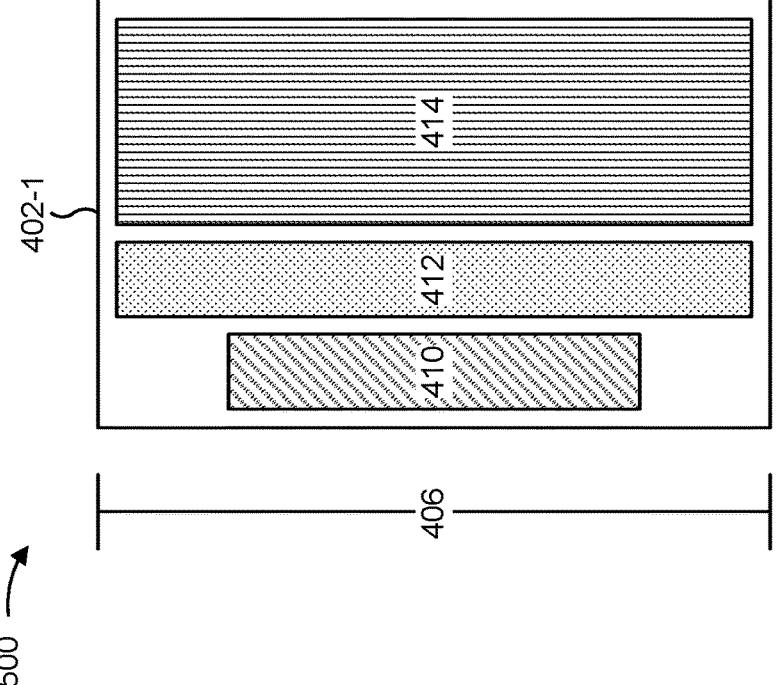
Figure 5:
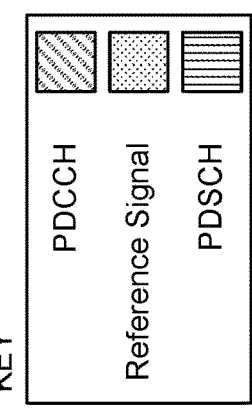

FIG. 5 is a diagram illustrating an example 500 of a restricted BW 502 that is based at least in part on an active BWP, in accordance with the present disclosure. The example 500 shows the first BWP 402 as described with regard to FIG. 4 in two states. Active BWP 402-1 may represent a first state of the first BWP 402 in which the restricted BW 502 is deactivated. Active BWP 402-2 may represent a second state of the first BWP 402 in which the restricted BW 502 is activated.

As shown by the example 500, the active BWP 402-1 may be configured with the bandwidth 406. A network node (e.g., the network node 110) transmitting DL communications may transmit the PDCCH 410, the reference signal 412, and/or the PDSCH 414 based at least in part on the bandwidth 406. For example, the network node may transmit the reference signal 412 and/or the PDSCH 414 based at in part on utilizing an entirety of the bandwidth 406 and/or a majority of the bandwidth 406. That is, an entirety of the bandwidth 406 is available for DL communications when the restricted BW 502 is deactivated. In some aspects, the network node may utilize a majority and/or entirety of the bandwidth 406 based at least in part on a volume of data traffic. To illustrate, the network node may configure the PDSCH 414 to use a majority and/or entirety of the bandwidth 406 based at least in part on data requirements associated with the UE (e.g., streaming video requirements and/or streaming audio requirements) satisfying a traffic volume threshold.

In some aspects, and as shown by reference number 504, the network node may determine to switch from utilizing an entirety of the bandwidth 406 associated with the active BWP 402-1 to utilizing a portion of the bandwidth 406. For instance, the network node may determine to operate in, and/or determine to transition the UE to, a network energy saving mode based at least in part on the data requirements associated with the UE failing to satisfy the traffic volume threshold. As further described below, the network node may indicate a configuration of the restricted BW 502 to the UE, such as a bandwidth 506 and/or a starting position 508 (shown as a resource block offset relative to a boundary of the active BWP 402-1) of the restricted BW 502. As one example, the network node may transmit the configuration of the restricted BW to the UE based at least in part on RRC signaling and transmit an activation indication based at least in part on DCI. To illustrate, the network node may indicate a UE-specific PDCCH monitoring configuration that indicates one or more control resource sets (CORESETs) associated with the active BWP 402-1, and the UE may derive the bandwidth 506 and/or the starting position 508 based at least in part on a particular CORESET associated with the active BWP 402-1. A "CORESET" may denote a set of physical resources within a BWP that are designated to carry PDCCH. A UE may derive a restricted BW based at least in part on a particular CORESET and/or a particular set of physical resources. Accordingly, the restricted BW 502 may be positioned at any location within the active BWP 402-2, such as a starting RB of the restricted BW 502 being positioned at a starting RB of the active BWP 402-2, the restricted BW 502 being centered on the active BWP 402-2, and/or an ending RB of the restricted BW 502 being positioned at an ending RB of the active BWP 402-2. Alternatively or additionally, the bandwidth 506 may be any bandwidth within the bandwidth 406 (e.g., a fraction of the bandwidth 406).

Activating the restricted BW 502 may indicate that one or more transmissions (shown as PDCCH 510, reference signal 512, and PDSCH 514) may occur within the bandwidth 506 associated with the restricted BW 502 and/or may be excluded outside of the bandwidth. That is, the network node may transmit the reference signal 512 within the bandwidth 506 (e.g., and not outside of the bandwidth 506). However, in other examples, the reference signal 512 may occur outside of the bandwidth 506 as shown by reference number 516-1 and/or reference number 516-2. Accordingly, a UE receiving the transmissions may process the transmissions based at least in part on the bandwidth 506. In activating the restricted BW 502, the unused portion of the active BWP 402-2 may be retained and not released for other uses. To illustrate, the network node may initially assign the active BWP 402-1 to the UE for DL communications. In activating the restricted BW 502, the unused portion of the active BWP 402-2 may remain assigned to the UE.

By activating a restricted BW, a network node may reduce energy consumption at a UE by reducing a bandwidth that the UE uses for receiving and/or processing DL communications. In some aspects, the network node may activate a restricted BW using fewer air interface resources relative to switching active BWPs. Alternatively or additionally, the UE may activate the restricted BW with less hardware configuration relative to switching active BWPs and subsequently reduce a hardware settling delay time. Using fewer air interface resources, and/or mitigating hardware settling delay times, may reduce data transfer latencies and/or increase data throughput relative to switching active BWPs.

As indicated above, FIG. 5 is provided as an example. Other examples may differ from what is described with regard to FIG. 5.

Figure 6:
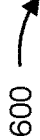
FIG. 6 is a diagram illustrating an example of a wireless communication process between a network node and a UE, in accordance with the present disclosure.

FIG. 6 is a diagram illustrating an example 600 of a wireless communication process between a network node (e.g., the network node 110) and a UE (e.g., the UE 120), in accordance with the present disclosure.

As shown by reference number 610, a network node 110 may transmit, and a UE 120 may receive, an active DL BWP indication. As one example, the network node 110 may transmit an RRC message that indicates one or more active BWP configurations, such as a first BWP configuration associated with an active DL BWP assigned to the UE 120 and/or a second BWP associated with an UL BWP assigned to the UE 120. In some aspects, the network node 110 may indicate the first BWP configuration and/or the second BWP configuration based at least in part on a BWP index that maps to a resource configuration. The resource configuration may indicate any combination of a starting RE and/or RB associated with the BWP configuration, a bandwidth (e.g., a number of REs and/or RBs) associated with the BWP configuration, a frequency offset (e.g., for identifying a frequency edge of the BWP), and/or an ending RE and/or RB. In some aspects, the network node 110 may transmit the active DL BWP indication as part of a connection setup procedure and/or a reconfiguration procedure.

The network node 110 may specify multiple BWP configurations based at least in part on an RRC message and activate a particular BWP using DCI and/or a MAC CE. Accordingly, transmitting (and/or receiving) the active DL BWP indication may include multiple transmissions (e.g., a first transmission associated with a BWP configuration and a second transmission associated with an instruction to activate a particular BWP associated with a particular BWP configuration). Alternatively or additionally, the network node 110 may specify a single DL BWP configuration and/or a single UL BWP configuration (e.g., using an RRC message, a MAC CE, or DCI) and implicitly indicate to use and/or activate the specified BWP for DL communication and/or an UL communication, respectively.

As shown by reference number 620, the network node 110 may transmit, and the UE 120 may receive, a UE-specific PDCCH monitoring configuration. To illustrate, the network node 110 may transmit the UE-specific PDCCH monitoring configuration as part of a connection setup procedure and/or a reconfiguration procedure. While the example 600 shows the UE-specific PDCCH configuration being transmitted as a separate transmission from the active DL BWP indication, other examples may include the network node transmitting the UE-specific PDCCH monitoring configuration with the active DL BWP indication. The UE-specific PDCCH monitoring configuration may indicate one or more CORESETs. Alternatively or additionally, the UE-specific PDCCH monitoring configuration may indicate a restricted DL BW configuration parameter, such as a BW size, a frequency offset, and/or a particular CORESET associated with the restricted DL BW. In some aspects, the network node 110 may indicate a restricted DL BW configuration parameter, such as the BW size, the frequency offset, and/or the particular CORESET, based at least in part on an RRC message, a MAC CE, and/or DCI (e.g., either with the UE-specific PDCCH monitoring configuration or separately).

As shown by reference number 630, the network node 110 and the UE 120 may communicate based at least in part on using the active DL BWP. In some aspects, the network node 110 and the UE 120 may iteratively communicate based at least in part on using the active DL BWP, as further shown by reference number 640. For example, the network node 110 may transmit, and the UE 120 may receive, PDCCH, a CSI-RS, a TRS, and/or a PDSCH based at least in part on the active DL BW. In some aspects, and while communicating based at least in part on the active DL BWP (e.g., before switching to using the restricted DL BW and/or operating in a network saving mode), the network node 110 may transmit scheduling information, such as a DL grant associated with a future PDSCH transmission and/or an SPS PDSCH grant associated with a future time slot.

As shown by reference number 650, the network node 110 may transmit, and the UE 120 may receive, an indication to activate the restricted DL BW. In some aspects, the restricted DL BW is a portion of the active DL BW. Transmitting the indication to activate the restricted DL BW may be based at least in part on a single transmission or multiple transmissions. As one example, the network node may transmit a (restricted) BW size indication that implicitly indicates to activate the restricted BW. Alternatively or additionally, the network node 110 may transmit an instruction to operate in a network energy saving mode that the UE 120 interprets as an instruction to activate the restricted DL BW. The network node 110 may transmit the indication to activate the restricted DL BW using any combination of an RRC message, a MAC CE, and/or DCI.

As shown by reference number 660, the UE 120 may determine a restricted DL BW configuration. While shown in the example 600 as occurring after receiving the "activate restricted DL BW" indication described with regard to the reference number 650, other examples may include the UE determining the restricted DL BW configuration prior to receiving an indication to activate the restricted DL BW.

In some aspects, the UE may determine the restricted DL BW based at least in part on a particular CORESET indicated by the UE-specific PDCCH monitoring configuration. As one example, the UE-specific PDCCH monitoring configuration may indicate multiple CORESETs and the UE 120 may select the particular CORESET from the multiple CORESETs. In some aspects, the network node 110 may indicate the particular CORESET to select, while in other aspects, the UE 120 may select the particular CORESET based at least in part on a communication standard. To illustrate, the UE 120 may select (e.g., as indicated by the network node or indicated by a communication standard) the particular CORESET based at least in part on a CORESET identifier (ID), such as by selecting (e.g., from the multiple CORESETs) a first CORESET that is associated with a lowest CORESET ID or a second CORESET that is associated with a highest CORESET ID. As another example, the UE 120 may select the particular CORESET based at least in part on an RB index associated with the particular CORESET, such as by selecting a CORESET that is associated with a lowest RB index.

In some aspects, the UE 120 may determine a configuration of the restricted DL BW based at least in part on the particular CORESET, such as a BW size of the restricted DL BW, a starting RB of the restricted DL BW, and/or an ending RB of the restricted DL BW. To illustrate, the UE 120 may determine a starting RB associated with the restricted DL BW as a starting RB of the particular CORESET. Alternatively or additionally, the UE 120 may determine the starting RB of the restricted DL BW based at least in part on a frequency offset. For example, the UE 120 may determine that the starting RB for the restricted DL BW is equal to the starting RB of the particular CORESET combined with the frequency offset.

The UE 120 may determine a BW size of the restricted BW using the frequency offset and the starting RB. For instance, the UE 120 may determine the BW size of the restricted DL BW as a frequency span that begins at the starting RB of the particular CORESET and spans to the frequency offset (e.g., spans an offset amount). As another example, the UE 120 may determine the BW size of the restricted DL BW as a BW size of the particular CORESET (e.g., the BW size of the restricted DL BW is equal to the BW size of the particular CORESET). In some aspects, the UE 120 may determine the BW size of the restricted DL BW based at least in part on the BW size of the particular CORESET and a frequency offset. To illustrate, the UE 120 may calculate the BW size of the restricted DL BW as the BW size of the particular CORESET plus the frequency offset. As further described above, the UE 120 may receive an indication of the frequency offset from the network node 110, such as in the UE-specific PDCCH monitoring configuration, an RRC message, a MAC CE, and/or DCI. In some aspects, the UE 120 may validate that a calculated and/or determined BW associated with the restricted DL BW satisfies a minimum BW size threshold.

As shown by reference number 670, the network node 110 and the UE 120 may communicate based at least in part on using the restricted DL BW. To illustrate, the UE 120 may switch to operating in a network energy saving mode, such as by switching from using the active DL BWP (e.g., the entirety of the active DL BWP) to using the restricted DL BW to receive a DL communication. In switching to the network energy saving mode and/or switching to using the restricted DL BW, the network node 110 may maintain the active DL BWP. That is, the network node 110 may refrain from reassigning unused resources (e.g., a resource outside of the restricted DL BW) associated with the active DL BWP to other devices and/or the network node 110 will refrain from reconfiguring the UE 120 with a new, different DL BWP.

In some aspects, as part of communicating by using the restricted DL BW, the network node 110 may transmit a reference signal, such as a CSI-RS and/or a TRS, and the UE may determine a reference signal configuration associated with the reference signal (e.g., a CSI-RS configuration associated with the CSI-RS). As one example, the network node 110 may transmit the reference signal only using resources located within the restricted DL BW. In other examples, the network node 110 may transmit the reference signal using a resource located outside of the restricted DL BW, as further described with regard to FIG. 5. Accordingly, the UE may determine an initial RB for receiving the reference signal (e.g., an initial RB associated with a valid CSI-RS resource) based at least in part on the restricted DL BW. Alternatively or additionally, the UE 120 may determine a number of RBs associated with receiving the reference signal (e.g., a number of RBs that are valid CSI-RS resources) using the restricted DL BW. Determining the initial RB and/or number of RBs may include selecting an initial RB and/or a number of RBs that are included within the restricted DL BW and ignoring a resource outside of the restricted DL BW that may carry the reference signal. That is, a resource outside of the restricted DL BW carrying a reference signal may be determined as invalid. However other examples may include determining that a resource outside of the restricted DL BW may be valid for carrying a reference signal.

In some aspects, as part of communicating with the network node 110 using the restricted DL BW and/or based at least in part on operating in a network energy saving mode, the UE 120 may generate a radio resource management (RRM) measurement metric. In some aspects, the UE 120 may generate the RRM measurement metric using a reference signal. To illustrate, the UE 120 may receive at least a portion of the reference signal using at least one resource that is outside of the restricted DL BW and determine whether to include that portion of the reference signal in an RRM measurement associated with generating the RRM measurement metric. For instance, the UE 120 may generate the RRM measurement metric by including the portion of the reference signal that is carried by the resource(s) outside of the restricted DL BW in the RRM measurement. In other examples, the UE 120 may generate the RRM measurement metric by excluding the portion of the reference signal that is carried by the resource(s) outside of the restricted DL BW from the RRM measurement. Examples of reference signals that may be used to generate the RRM measurement metric may include a CSI-RS or a synchronization signal block (SSB).

Alternatively or additionally, the UE 120 may generate a radio link management (RLM) measurement metric (e.g., as part of communicating with the network node as shown by the reference number 670). In some aspects, the UE 120 may generate the RLM measurement metric using a reference signal and an RLM measurement. The UE 120 may receive at least a portion of the reference signal in at least one resource that is outside of the restricted DL BW and determine whether to include that portion of the reference signal in the RLM measurement. For example, the UE 120 may receive at least a portion of an SSB in at least one resource that is outside of the restricted DL BW and generate the RLM measurement metric by including the portion of the SSB that is carried by the resource(s) outside of the restricted DL BW in the RLM measurement. As another example, the UE 120 may receive at least a portion of a CSI-RS in one or more resources outside of the restricted DL BW. In at least one aspect, the UE 120 may generate the RLM measurement metric by excluding the portion of the CSI-RS that is in one or more resources outside of the restricted DL BW from the RLM measurement. In at least another aspect, the UE 120 may generate the RLM measurement metric by including the portion of the CSI-RS carried by the resource(s) outside of the restricted DL BW in the RLM measurement.

As shown by reference number 680, the UE 120 may validate a resource based at least in part on communicating with the network node 110 using the restricted DL BW. As one example, the UE 120 may receive a DL resource grant from the network node 110 before switching to operating in the network energy saving mode (e.g., as part of communicating with the network node using the active DL BWP, as shown by the reference number 630). Based at least in part on operating in a network energy saving mode, the UE 120 may validate that a frequency domain resource assignment associated with the DL resource grant is within the restricted DL BW. In some aspects, the DL resource grant may be associated with a PDSCH communication and the UE may receive the PDSCH communication if the frequency domain resource assignment has been validated (e.g., confirmed to be within the restricted DL BW).

In some aspects, the UE 120 may receive an SPS PDSCH grant (e.g., as part of communicating with the network node using the active DL BWP, as shown by the reference number 630). The UE may validate, as the resource, an occasion of the SPS PDSCH grant (e.g., while operating in a network energy saving mode). In some aspects, the UE may determine whether to receive a PDSCH transmission in the occasion based at least in part on the validating. For instance, the UE 120 may validate whether occasion resources associated with the occasion fail to fully overlap with restricted DL BW resources. In some aspects, the UE 120 may determine to ignore reception in the occasion based at least in part on validating that the occasion resources fail to fully overlap with the restricted DL BW resources. Alternatively or additionally, the UE 120 may determine, as part of validating the resource, whether at least a portion of the occasion resources overlaps with at least a portion of the restricted DL BW resources. The UE may determine to receive a portion of the PDSCH transmission that is included in the portion of the occasion resources that overlaps with the portion of the restricted DL BW resources. However, in other examples, the UE 120 may determine to receive the PDSCH transmission in all occasion resources independently of whether the resource is included or excluded from the restricted DL BW. That is, the UE 120 may receive the PDSCH transmission based at least in part on a first occasion resource that is included in the restricted DL BW and/or a second occasion resource that is outside of the restricted DL BW.

In some aspects, the network node 110 and the UE 120 may iteratively communicate with one another based at least in part on using the restricted DL BW and/or the UE may iteratively validate a resource as further shown by reference number 690. Alternatively or additionally, the network node 110 may determine to deactivate the restricted DL BW and/or switch to using an entirety of the active DL BWP.

By activating a restricted BW, a network node may reduce energy consumption at a UE by reducing a bandwidth that the UE uses for receiving and/or processing DL communications. In some aspects, the network node may activate a restricted BW using fewer air interface resources relative to switching active BWPs. Alternatively or additionally, the UE may activate the restricted BW with less hardware configuration relative to switching active BWPs and subsequently reduce a hardware settling delay time. Using fewer air interface resources, and/or mitigating hardware settling delay times may reduce data transfer latencies and/or increase data throughput relative to switching active BWPs.

As indicated above, FIG. 6 is provided as an example. Other examples may differ from what is described with regard to FIG. 6.

Figure 7:
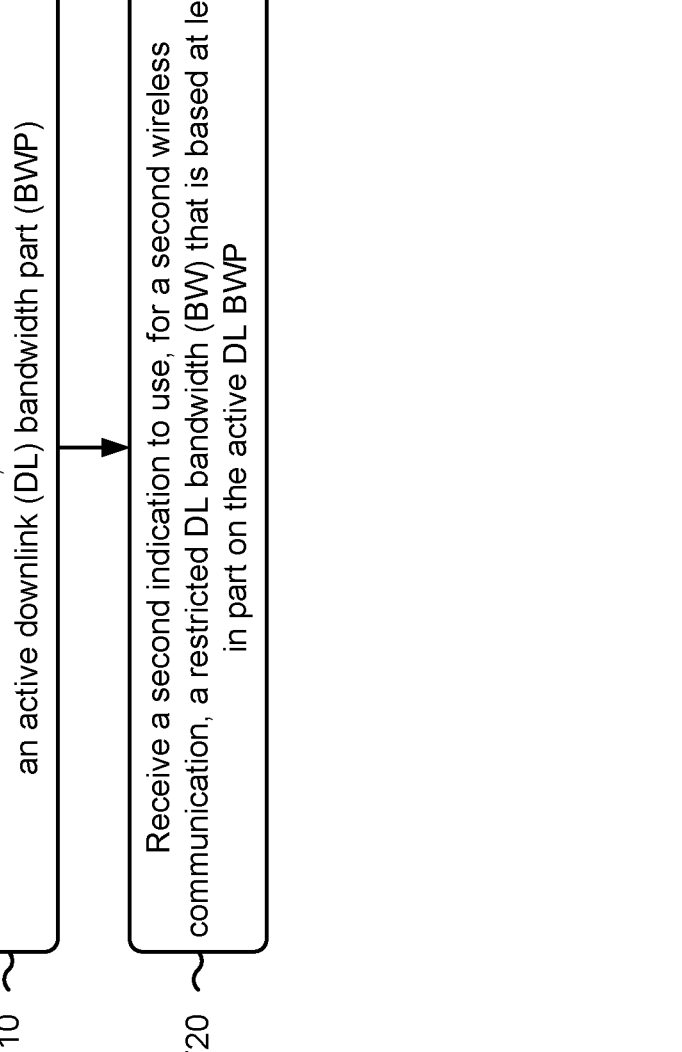
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with downlink frequency bandwidth restriction management.

As shown in FIG. 7, in some aspects, process 700 may include receiving a first indication to use, for a first wireless communication, an active DL BWP (block 710). For example, the UE (e.g., using communication manager 140 and/or reception component 902, depicted in FIG. 9) may receive a first indication to use, for a first wireless communication, an active DL BWP, as described above.

As further shown in FIG. 7, in some aspects, process 700 may include receiving a second indication to use, for a second wireless communication, a restricted DL BW that is based at least in part on the active DL BWP (block 720). For example, the UE (e.g., using communication manager 140 and/or reception component 902, depicted in FIG. 9) may receive a second indication to use, for a second wireless communication, a restricted DL BW that is based at least in part on the active DL BWP, as described above.

Process 700 may include additional aspects, such as any single aspect or any combination of aspects described below and/or in connection with one or more other processes described elsewhere herein.

In a first aspect, receiving the second indication includes receiving an instruction to operate in a network energy saving mode, and operating in the network energy saving mode based at least in part on switching from using, for receiving one or more downlink communications, the active DL BWP to the restricted DL BW.

In a second aspect, the restricted DL BW is a sub-portion of the active DL BWP.

In a third aspect, process 700 includes receiving, prior to the second indication to use the restricted DL BW, a UE-specific PDCCH monitoring configuration that indicates one or more CORESETs, and determining the restricted DL BW based at least in part on a particular CORESET of the one or more CORESETs.

In a fourth aspect, determining the restricted DL BW includes determining the restricted DL BW based at least in part on a starting RB of the particular CORESET.

In a fifth aspect, determining the restricted DL BW further includes determining the restricted DL BW based at least in part on a frequency offset from the starting RB of the particular CORESET.

In a sixth aspect, process 700 includes determining a BW size of the restricted DL BW based at least in part on a BW size of the particular CORESET.

In a seventh aspect, determining the BW size of the restricted DL BW includes determining the BW size of the restricted DL BW based at least in part on the BW size of the particular CORESET and a frequency offset.

In an eighth aspect, process 700 includes receiving a third indication of the frequency offset.

In a ninth aspect, determining the BW size of the restricted DL BW includes validating that a determined BW size satisfies a minimum BW size threshold.

In a tenth aspect, the one or more CORESETs include multiple CORESETs, and process 700 further includes selecting the particular CORESET from the multiple CORE-SETs based at least in part on a CORESET ID associated with the particular CORESET.

In an eleventh aspect, selecting the particular CORESET includes selecting, as the particular CORESET, a CORESET from the multiple CORESETs that is associated with a lowest CORESET ID of the multiple CORESETs, or a highest CORESET ID of the multiple CORESETs.

In a twelfth aspect, the one or more CORESETs include multiple CORESETs, and process 700 further includes selecting the particular CORESET from the multiple CORE-SETs based at least in part on an RB index associated with the particular CORESET.

In a thirteenth aspect, selecting the particular CORESET includes selecting, as the particular CORESET, a CORESET from the multiple CORESETs that is associated with a lowest RB index.

In a fourteenth aspect, process 700 includes receiving at least one restricted DL BW configuration parameter in the UE-specific PDCCH monitoring configuration.

In a fifteenth aspect, process 700 includes receiving a BW size indication associated with a BW size of the restricted DL BW.

In a sixteenth aspect, receiving the BW size indication includes receiving the BW size indication based at least in part on using at least one of a radio resource control message, a MAC CE, or downlinking control information.

In a seventeenth aspect, process 700 includes determining, while operating in a network energy saving mode, a CSI-RS configuration based at least in part on the restricted DL BW.

In an eighteenth aspect, determining the CSI-RS configuration includes determining an initial RB associated with the CSI-RS based at least in part on the restricted DL BW.

In a nineteenth aspect, determining the CSI-RS configuration includes determining a number of RBs associated with the CSI-RS based at least in part on the restricted DL BW.

In a twentieth aspect, process 700 includes receiving a DL resource grant that is based at least in part on the restricted DL BW, and validating, while operating in a network energy saving mode, that a frequency domain resource assignment associated with the DL resource grant is within the restricted DL BW.

In a twenty-first aspect, receiving the DL resource grant includes receiving the DL resource grant before switching to operating in the network energy saving mode.

In a twenty-second aspect, process 700 includes receiving, as the second wireless communication, a PDSCH communication based at least in part on the DL resource grant.

In a twenty-third aspect, process 700 includes receiving an SPS PDSCH grant, validating an occasion of the SPS PDSCH grant based at least in part on operating in a network energy saving mode, and determining whether to receive a PDSCH transmission in the occasion based at least in part on the validating.

In a twenty-fourth aspect, validating the occasion includes validating whether occasion resources associated with the occasion fail to fully overlap with restricted DL BW resources.

In a twenty-fifth aspect, determining whether to receive the PDSCH transmission in the occasion includes determining to ignore reception in the occasion based at least in part on validating that the occasion resources fail to fully overlap with the restricted DL BW resources.

In a twenty-sixth aspect, determining whether to receive the PDSCH transmission in the occasion includes determining, based at least in part on validating that a first portion of the occasion resources overlaps with at least a second portion of the restricted DL BW resources, to receive a portion of the PDSCH transmission that is included in the first portion of the occasion resources that overlaps with the at least a second portion of the restricted DL BW resources.

In a twenty-seventh aspect, determining whether to receive the PDSCH transmission in the occasion includes determining, based at least in part on validating that a first portion of the occasion resources overlaps with at least a second portion of the restricted DL BW resources, to receive the PDSCH transmission in all of the occasion resources.

In a twenty-eighth aspect, the occasion resources include at least one of a first occasion resource that is included in the restricted DL BW, or a second occasion resource that is outside of the restricted DL BW.

In a twenty-ninth aspect, process 700 includes receiving an SPS PDSCH grant, and receiving, while operating in a network energy saving mode, an entirety of a PDSCH transmission independently of whether at least one occasion resource of an occasion of the SPS PDSCH grant is outside of the restricted DL BW.

In a thirtieth aspect, process 700 includes generating, while operating in a network energy saving mode, an RRM measurement metric based at least in part on a reference signal.

In a thirty-first aspect, process 700 includes receiving the reference signal based at least in part on at least one resource that is outside of the restricted DL BW, and generating the RRM measurement metric is based at least in part on the at least one resource that is outside of the restricted DL BW.

In a thirty-second aspect, process 700 includes receiving the reference signal in at least one resource that is outside of the restricted DL BW, and generating the RRM measurement metric includes generating the RRM measurement metric based at least in part on excluding a portion of the reference signal that is in the at least one resource that is outside of the restricted DL BW from an RRM measurement associated with generating the RRM measurement metric.

In a thirty-third aspect, the reference signal includes at least one of a CSI-RS, or an SSB.

In a thirty-fourth aspect, process 700 includes generating, while operating in a network energy saving mode, an RLM measurement metric based at least in part on a reference signal.

In a thirty-fifth aspect, the reference signal is an SSB, process 700 includes receiving at least a portion of the SSB in at least one resource that is outside of the restricted DL BW, and generating the RLM measurement metric is based at least in part on including the at least portion of the SSB in the at least one resource that is outside of the restricted DL BW in an RLM measurement associated with generating the RLM measurement metric.

In a thirty-sixth aspect, the reference signal is a CSI-RS, process 700 includes receiving at least a portion of the CSI-RS in at least one resource that is outside of the restricted DL BW, and generating the RLM measurement metric includes generating the RLM measurement metric based at least in part on excluding the at least portion of the CSI-RS that is in the at least one resource that is outside of the restricted DL BW in an RLM measurement associated with generating the RLM measurement metric.

In a thirty-seventh aspect, the reference signal is a CSI-RS, process 700 includes receiving at least a portion of the CSI-RS in at least one resource that is outside of the restricted DL BW, and generating the RLM measurement metric includes generating the RLM measurement metric based at least in part on including the at least portion of the CSI-RS that is in the at least one resource that is outside of the restricted DL BW in an RLM measurement associated with generating the RLM measurement metric.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
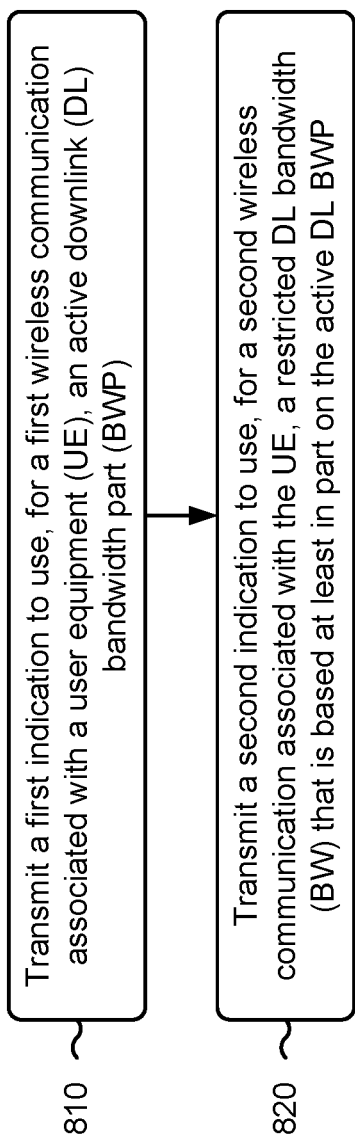
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with downlink frequency bandwidth restriction management.

As shown in FIG. 8, in some aspects, process 800 may include transmitting a first indication to use, for a first wireless communication associated with a UE, an active DL BWP (block 810). For example, the network node (e.g., using communication manager 150 and/or transmission component 1004, depicted in FIG. 10) may transmit a first indication to use, for a first wireless communication associated with a UE, a DL BWP, as described above.

As further shown in FIG. 8, in some aspects, process 800 may include transmitting a second indication to use, for a second wireless communication associated with the UE, a restricted DL BW that is based at least in part on the active DL BWP (block 820). For example, the network node (e.g., using communication manager 150 and/or transmission component 1004, depicted in FIG. 10) may transmit a second indication to use, for a second wireless communication associated with the UE, a restricted DL BW that is based at least in part on the active DL BWP, as described above.

Process 800 may include additional aspects, such as any single aspect or any combination of aspects described below and/or in connection with one or more other processes described elsewhere herein.

In a first aspect, transmitting the second indication includes transmitting an instruction to operate in a network energy saving mode.

In a second aspect, the restricted DL BW is a sub-portion of the active DL BWP.

In a third aspect, process 800 includes transmitting, prior to the second indication to use the restricted DL BW, a UE-specific PDCCH monitoring configuration that indicates one or more CORESETs. In some aspects, the restricted DL BW is based at least in part on a particular CORESET of the one or more CORESETs.

In a fourth aspect, the restricted DL BW is based at least in part on a starting RB of the particular CORESET.

In a fifth aspect, the restricted DL BW is based at least in part on a frequency offset from the starting RB of the particular CORESET.

In a sixth aspect, a BW size of the restricted DL BW is based at least in part on a BW size of the particular CORESET.

In a seventh aspect, the BW size of the restricted DL BW is based at least in part on the BW size of the particular CORESET and a frequency offset.

In an eighth aspect, process 800 includes transmitting a third indication of the frequency offset.

In a ninth aspect, the one or more CORESETs comprise multiple CORESETs, and process 800 includes indicating to select the particular CORESET from the multiple CORESETs based at least in part on a CORESET ID associated with the particular CORESET.

In a tenth aspect, indicating to select the particular CORESET includes indicating to select, as the particular CORESET, a CORESET from the multiple CORESETs that is associated with a lowest CORESET ID of the multiple CORESETs, or a highest CORESET ID of the multiple CORESETs.

In an eleventh aspect, the one or more CORESETs comprise multiple CORESETs, and process 800 includes indicating to select the particular CORESET from the multiple CORESETs based at least in part on an RB index associated with the particular CORESET.

In a twelfth aspect, indicating to select the particular CORESET includes indicating to select, as the particular CORESET, a CORESET from the multiple CORESETs that is associated with a lowest RB index.

In a thirteenth aspect, process 800 includes indicating at least one restricted DL BW configuration parameter in the UE-specific PDCCH monitoring configuration.

In a fourteenth aspect, process 800 includes transmitting a BW size indication associated with a BW size of the restricted DL BW.

In a fifteenth aspect, transmitting the BW size indication includes transmitting the BW size indication based at least in part on using at least one of a radio resource control message, a MAC CE, or downlinking control information.

In a sixteenth aspect, process 800 includes indicating a DL resource grant that is based at least in part on the restricted DL BW.

In a seventeenth aspect, the DL resource grant is within the restricted DL BW.

In an eighteenth aspect, process 800 includes transmitting, as the second wireless communication, a PDSCH communication based at least in part on the DL resource grant.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
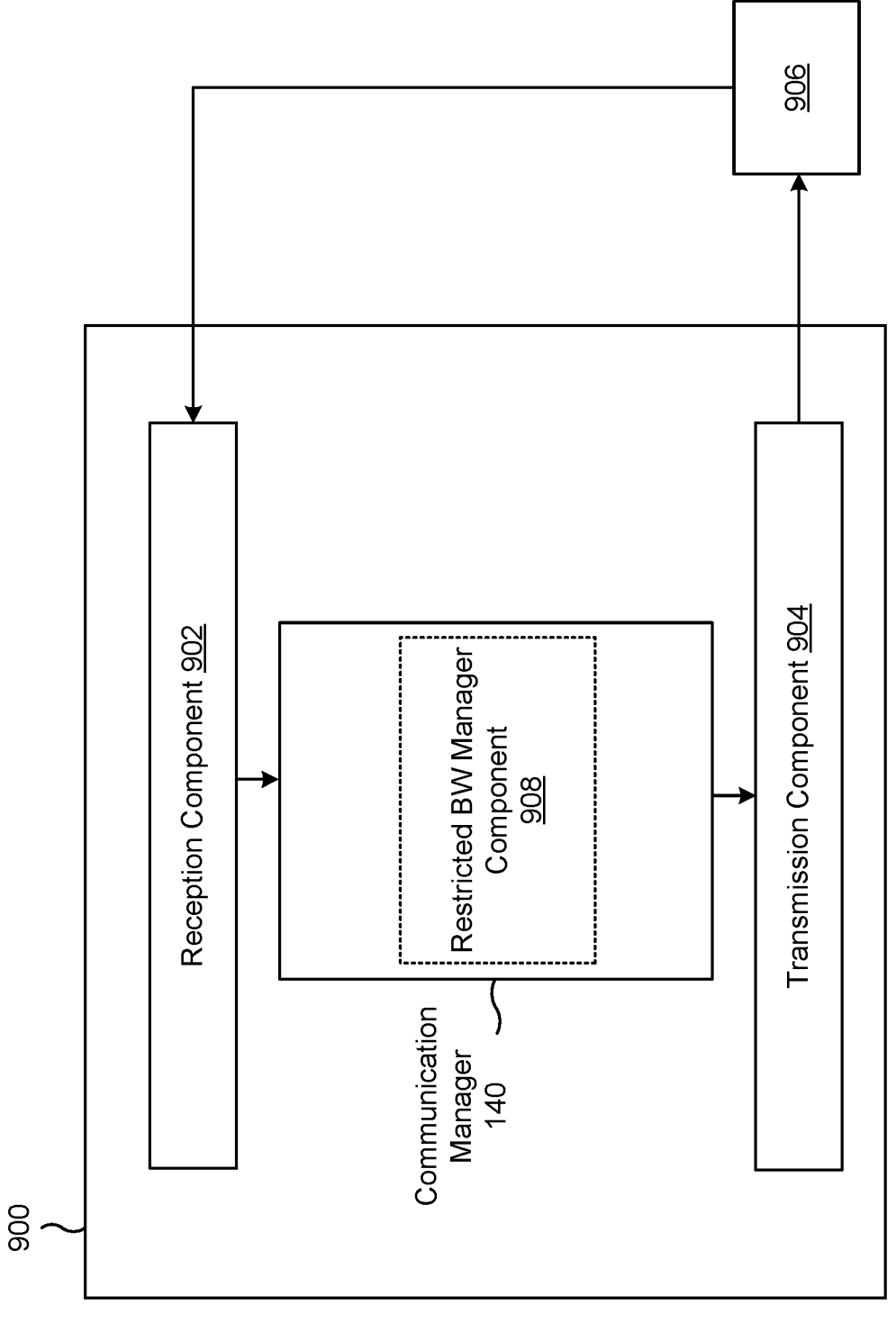
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a restricted BW manager component 908, among other examples.

In some aspects, the apparatus 900 may be configured to perform one or more operations described herein in connection with FIGS. 5-8. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a first indication to use, for a first wireless communication, an active DL BWP. The reception component 902 may receive a second indication to use, for a second wireless communication, a restricted DL BW that is based at least in part on the active DL BWP.

The restricted BW manager component 908 may receive, by way of the reception component 902 and prior to the second indication to use the restricted DL BW, a UE-specific PDCCH monitoring configuration that indicates one or more CORESETs. In some aspects, the restricted BW manager component 908 may determine the restricted DL BW based at least in part on a particular CORESET of the one or more CORESETs. Alternatively or additionally, the restricted BW manager component 908 may determine a BW size of the restricted DL BW based at least in part on a BW size of the particular CORESET.

The restricted BW manager component 908 may receive, by way of the reception component 902 may receive a third indication of the frequency offset. Alternatively or additionally, the restricted BW manager component 908 may receive, by way of the reception component 902, at least one restricted DL BW configuration parameter in the UE-specific PDCCH monitoring configuration. In some aspects, the restricted BW manager component 908 may receive, by way of the reception component 902, a BW size indication associated with a BW size of the restricted DL BW.

The restricted BW manager component 908 may determine, while operating in a network energy saving mode, a CSI-RS configuration based at least in part on the restricted DL BW. In some aspects, the restricted BW manager component 908 may receive, by way of the reception component 902, a DL resource grant that is based at least in part on the restricted DL BW. The restricted BW manager component 908 may validate, while operating in a network energy saving mode, that a frequency domain resource assignment associated with the DL resource grant is within the restricted DL BW.

The reception component 902 may receive, as the second wireless communication, a PDSCH communication based at least in part on the DL resource grant. In some aspects, the reception component 902 may receive an SPS PDSCH grant. The restricted BW manager component 908 may validate an occasion of the SPS PDSCH grant based at least in part on operating in a network energy saving mode. As one example, the restricted BW manager component 908 may determine whether to receive a PDSCH transmission in the occasion based at least in part on the validating.

The reception component 902 may receive an SPS PDSCH grant. The restricted BW manager component 908 may validate an occasion of the SPS PDSCH grant based at least in part on operating in a network energy saving mode. In some aspects, the restricted BW manager component 908 may determine, while operating in the network energy saving mode, whether to receive a PDSCH transmission in the occasion based at least in part on the validating. In some aspects, the restricted BW manager component 908 may receive an entirety of a PDSCH transmission in the occasion independently of whether at least one occasion resource of the SPS PDSCH grant is outside of the restricted DL BW.

The restricted BW manager component 908 may generate, while operating in a network energy saving mode, an RRM measurement metric based at least in part on a reference signal. In some aspects, the restricted BW manager component 908 may receive, by way of the reception component 902, the reference signal based at least in part on at least one resource that is outside of the restricted DL BW, and generating the RRM measurement metric is based at least in part on the at least one resource that is outside of the restricted DL BW. As one example, the restricted BW manager component 908 may receive, by way of the reception component 902, the reference signal in at least one resource that is outside of the restricted DL BW. Alternatively or additionally, the restricted BW manager component 908 may generate, while operating in a network energy saving mode, an RLM measurement metric based at least in part on a reference signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
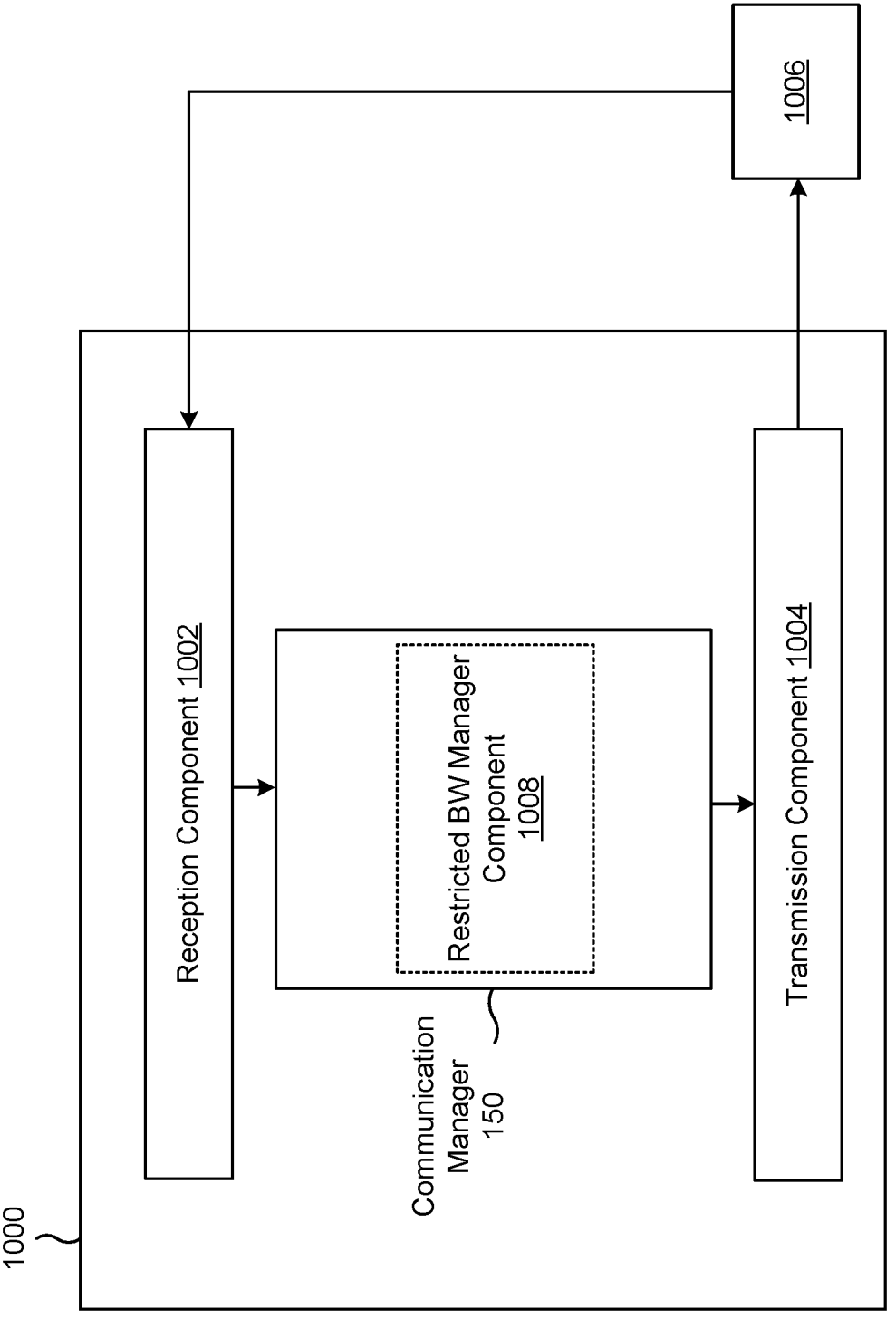
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150) may include one or more of a restricted BW manager component 1008, among other examples.

In some aspects, the apparatus 1000 may be configured to perform one or more operations described herein in connection with FIGS. 5-8. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit a first indication to use, for a first wireless communication associated with a UE, a DL BWP. The transmission component 1004 may transmit a second indication to use, for a second wireless communication associated with the UE, a restricted DL BW that is based at least in part on the active DL BWP.

The transmission component 1004 may transmit, prior to the second indication to use the restricted DL BW, a UE-specific PDCCH monitoring configuration that indicates one or more CORESETs. In some aspects, the restricted DL BW is based at least in part on a particular CORESET of the one or more CORESETs.

The transmission component 1004 may transmit a third indication of the frequency offset.

The restricted BW manager component 1008 may indicate at least one restricted DL BW configuration parameter in the UE-specific PDCCH monitoring configuration. In some aspects, the restricted BW manager component 1008 may transmit, by way of the transmission component 1004, a BW size indication associated with a BW size of the restricted DL BW. Alternatively or additionally, the restricted BW manager component 1008 may indicate a DL resource grant that is based at least in part on the restricted DL BW. The restricted BW manager component 1008 may transmit, by way of the transmission component 1004 and as the second wireless communication, a PDSCH communication based at least in part on the DL resource grant.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a first indication to use, for a first wireless communication, an active downlink (DL) bandwidth part (BWP); and receiving a second indication to use, for a second wireless communication, a restricted DL bandwidth (BW) that is based at least in part on the active DL BWP.

Aspect 2: The method of Aspect 1, wherein receiving the second indication comprises: receiving an instruction to operate in a network energy saving mode; and operating in the network energy saving mode based at least in part on switching from using, for receiving one or more downlink communications, the active DL BWP to the restricted DL BW.

Aspect 3: The method of Aspect 1 or Aspect 2, wherein the restricted DL BW is a sub-portion of the active DL BWP.

Aspect 4: The method of any one of Aspects 1-3, further comprising: receiving, prior to the second indication to use the restricted DL BW, a UE-specific physical downlink control channel (PDCCH) monitoring configuration that indicates one or more control resource sets (CORESETs); and determining the restricted DL BW based at least in part on a particular CORESET of the one or more CORESETs.

Aspect 5: The method of Aspect 4, wherein determining the restricted DL BW comprises: determining the restricted DL BW based at least in part on a starting resource block (RB) of the particular CORESET.

Aspect 6: The method of Aspect 4 or Aspect 5, wherein determining the restricted DL BW further comprises: determining the restricted DL BW based at least in part on a frequency offset from the starting RB of the particular CORESET.

Aspect 7: The method of any one of Aspects 4-6, further comprising: determining a BW size of the restricted DL BW based at least in part on a BW size of the particular CORESET.

Aspect 8: The method of Aspect 7, wherein determining the BW size of the restricted DL BW comprises: determining the BW size of the restricted DL BW based at least in part on the BW size of the particular CORESET and a frequency offset.

Aspect 9: The method of any one of Aspects 1-8, further comprising: receiving a third indication of the frequency offset.

Aspect 10: The method of any one of Aspects 7-9, wherein determining the BW size of the restricted DL BW comprises: validating that a determined BW size satisfies a minimum BW size threshold.

Aspect 11: The method of any one of Aspects 4-10, wherein the one or more CORESETs comprise multiple CORESETs, and the method further comprises: selecting the particular CORESET from the multiple CORESETs based at least in part on a CORESET identifier (ID) associated with the particular CORESET.

Aspect 12: The method of Aspect 11, wherein selecting the particular CORESET comprises: selecting, as the particular CORESET, a CORESET from the multiple CORESETs that is associated with: a lowest CORESET ID of the multiple CORESETs, or a highest CORESET ID of the multiple CORESETs.

Aspect 13: The method of any one of Aspects 4-12, wherein the one or more CORESETs comprise multiple CORESETs, and the method further comprises: selecting the particular CORESET from the multiple CORESETs based at least in part on a resource block (RB) index associated with the particular CORESET.

Aspect 14: The method of Aspect 13, wherein selecting the particular CORESET comprises: selecting, as the particular CORESET, a CORESET from the multiple CORESETs that is associated with a lowest RB index.

Aspect 15: The method of any one of Aspects 4-14, further comprising: receiving at least one restricted DL BW configuration parameter in the UE-specific PDCCH monitoring configuration.

Aspect 16: The method of any one of Aspects 1-15, further comprising: receiving a BW size indication associated with a BW size of the restricted DL BW.

Aspect 17: The method of Aspect 16, wherein receiving the BW size indication comprises: receiving the BW size indication based at least in part on using at least one of: a radio resource control message, a medium access control (MAC) control element (CE), or downlink control information.

Aspect 18: The method of any one of Aspects 1-17, further comprising: determining, while operating in a network energy saving mode, a channel state information reference signal (CSI-RS) configuration based at least in part on the restricted DL BW.

Aspect 19: The method of Aspect 18, wherein determining the CSI-RS configuration comprises: determining an initial resource block (RB) associated with a CSI-RS based at least in part on the restricted DL BW.

Aspect 20: The method of Aspect 18 or Aspect 19, wherein determining the CSI-RS configuration comprises: determining a number of resource blocks (RBs) associated with a CSI-RS based at least in part on the restricted DL BW.

Aspect 21: The method of any one of Aspects 1-20, further comprising: receiving a DL resource grant that is based at least in part on the restricted DL BW; and validating, while operating in a network energy saving mode, that a frequency domain resource assignment associated with the DL resource grant is within the restricted DL BW.

Aspect 22: The method of Aspect 21, wherein receiving the DL resource grant comprises: receiving the DL resource grant before switching to operating in the network energy saving mode.

Aspect 23: The method of Aspect 21 or Aspect 22, further comprising: receiving, as the second wireless communication, a physical downlink shared channel communication based at least in part on the DL resource grant.

Aspect 24: The method of any one of Aspects 1-23, further comprising: receiving a semi-persistent scheduling (SPS) physical downlink shared channel (PDSCH) grant; validating an occasion of the SPS PDSCH grant based at least in part on operating in a network energy saving mode; and determining whether to receive a PDSCH transmission in the occasion based at least in part on the validating.

Aspect 25: The method of Aspect 24, wherein validating the occasion comprises: validating whether occasion resources associated with the occasion fail to fully overlap with restricted DL BW resources.

Aspect 26: The method of Aspect 25, wherein determining whether to receive the PDSCH transmission in the occasion comprises: determining to ignore reception in the occasion based at least in part on validating that the occasion resources fail to fully overlap with the restricted DL BW resources.

Aspect 27: The method of Aspect 25, wherein determining whether to receive the PDSCH transmission in the occasion comprises: determining, based at least in part on validating that a first portion of the occasion resources overlaps with at least a second portion of the restricted DL BW resources, to receive a portion of the PDSCH transmission that is included in the first portion of the occasion resources that overlaps with the at least a second portion of the restricted DL BW resources.

Aspect 28: The method of Aspect 25, wherein determining whether to receive the PDSCH transmission in the occasion comprises: determining, based at least in part on validating that a first portion of the occasion resources overlaps with at least a second portion of the restricted DL BW resources, to receive the PDSCH transmission in all of the occasion resources.

Aspect 29: The method of Aspect 28, wherein the occasion resources include at least one of: a first occasion resource that is included in the restricted DL BW, or a second occasion resource that is outside of the restricted DL BW.

Aspect 30: The method of any one of Aspects 1-29, further comprising: receiving a semi-persistent scheduling (SPS) physical downlink shared channel (PDSCH) grant; and receiving, while operating in a network energy saving mode, an entirety of a PDSCH transmission independently of whether at least one occasion resource of the SPS PDSCH grant is outside of the restricted DL BW.

Aspect 31: The method of any one of Aspects 1-31, further comprising: generating, while operating in a network energy saving mode, a radio resource management (RRM) measurement metric based at least in part on a reference signal.

Aspect 32: The method of Aspect 31, further comprising: receiving the reference signal based at least in part on at least one resource that is outside of the restricted DL BW, wherein generating the RRM measurement metric is based at least in part on the at least one resource that is outside of the restricted DL BW.

Aspect 33: The method of Aspect 31, further comprising: receiving the reference signal in at least one resource that is outside of the restricted DL BW, wherein generating the RRM measurement metric comprises: generating the RRM measurement metric based at least in part on excluding a portion of the reference signal that is in the at least one resource that is outside of the restricted DL BW from an RRM measurement associated with generating the RRM measurement metric. wherein generating the RRM measurement metric comprises: generating the RRM measurement metric based at least in part on excluding a portion of the reference signal that is in the at least one resource that is outside of the restricted DL BW from an RRM measurement associated with generating the RRM measurement metric.

Aspect 34: The method of any one of Aspects 31-33, wherein the reference signal comprises at least one of: a channel state information reference signal (CSI-RS), or a synchronization signal block (SSB).

Aspect 35: The method of any one of Aspects 1-34, further comprising: generating, while operating in a network energy saving mode, a radio link management (RLM) measurement metric based at least in part on a reference signal.

Aspect 36: The method of Aspect 35, wherein the reference signal is a synchronization signal block (SSB), and the method further comprises: receiving at least a portion of the SSB in at least one resource that is outside of the restricted DL BW, wherein generating the RLM measurement metric is based at least in part on including the at least portion of the SSB in the at least one resource that is outside of the restricted DL BW in an RLM measurement associated with generating the RLM measurement metric.

Aspect 37: The method of Aspect 35, wherein the reference signal is a channel state information reference signal (CSI-RS), and the method further comprises: receiving at least a portion of the CSI-RS in at least one resource that is outside of the restricted DL BW, wherein generating the RLM measurement metric comprises: generating the RLM measurement metric based at least in part on excluding the at least portion of the CSI-RS that is in the at least one resource that is outside of the restricted DL BW in an RLM measurement associated with generating the RLM measurement metric.

Aspect 38: The method of Aspect 35, wherein the reference signal is a channel state information reference signal (CSI-RS), and the method further comprises: receiving at least a portion of the CSI-RS in at least one resource that is outside of the restricted DL BW, wherein generating the RLM measurement metric comprises: generating the RLM measurement metric based at least in part on including the at least portion of the CSI-RS that is in the at least one resource that is outside of the restricted DL BW in an RLM measurement associated with generating the RLM measurement metric.

Aspect 39: A method of wireless communication performed by a network node, comprising: transmitting a first indication to use, for a first wireless communication associated with a user equipment (UE), an active downlink (DL) bandwidth part (BWP); and transmitting a second indication to use, for a second wireless communication associated with the UE, a restricted DL bandwidth (BW) that is based at least in part on the active DL BWP.

Aspect 40: The method of Aspect 39, wherein transmitting the second indication comprises: transmitting an instruction to operate in a network energy saving mode.

Aspect 41: The method of Aspect 39 or 40, wherein the restricted DL BW is a sub-portion of the active DL BWP.

Aspect 42: The method of any one of Aspects 39-41, further comprising: transmitting, prior to the second indication to use the restricted DL BW, a UE-specific physical downlink control channel (PDCCH) monitoring configuration that indicates one or more control resource sets (CORESETs), wherein the restricted DL BW is based at least in part on a particular CORESET of the one or more CORESETs.

Aspect 43: The method of Aspect 42, wherein the restricted DL BW is based at least in part on a starting resource block (RB) of the particular CORESET.

Aspect 44: The method of Aspect 43, wherein the restricted DL BW is based at least in part on a frequency offset from the starting RB of the particular CORESET.

Aspect 45: The method of any one of Aspects 42-44, wherein a BW size of the restricted DL BW is based at least in part on a BW size of the particular CORESET.

Aspect 46: The method of Aspect 45, wherein the BW size of the restricted DL BW is based at least in part on the BW size of the particular CORESET and a frequency offset.

Aspect 47: The method of any one of Aspects 39-46, further comprising: transmitting a third indication of the frequency offset.

Aspect 48: The method of Aspect 42, wherein the one or more CORESETs comprise multiple CORESETs, and the method further comprises: indicating to select the particular CORESET from the multiple CORESETs based at least in part on a CORESET identifier (ID) associated with the particular CORESET.

Aspect 49: The method of Aspect 48, wherein indicating to select the particular CORESET comprises: indicating to select, as the particular CORESET, a CORESET from the multiple CORESETs that is associated with: a lowest CORESET ID of the multiple CORESETs, or a highest CORESET ID of the multiple CORESETs.

Aspect 50: The method of any one of Aspects 42-49, wherein the one or more CORESETs comprise multiple CORESETs, and the method further comprises: indicating to select the particular CORESET from the multiple CORE-SETs based at least in part on a resource block (RB) index associated with the particular CORESET.

Aspect 51: The method of Aspect 50, wherein indicating to select the particular CORESET comprises: indicating to select, as the particular CORESET, a CORESET from the multiple CORESETs that is associated with a lowest RB index.

Aspect 52: The method of any one of Aspects 42-51, further comprising: indicating at least one restricted DL BW configuration parameter in the UE-specific PDCCH monitoring configuration.

Aspect 53: The method of any one of Aspects 39-52, further comprising: transmitting a BW size indication associated with a BW size of the restricted DL BW.

Aspect 54: The method of Aspect 53, wherein transmitting the BW size indication comprises: transmitting the BW size indication based at least in part on using at least one of: a radio resource control message, a medium access control (MAC) control element (CE), or downlink control information.

Aspect 55: The method of any one of Aspects 39-54, further comprising: indicating a DL resource grant that is based at least in part on the restricted DL BW.

Aspect 56: The method of Aspect 55, wherein the DL resource grant is within the restricted DL BW.

Aspect 57: The method of any one of Aspects 55-56, further comprising: transmitting, as the second wireless communication, a physical downlink shared channel communication based at least in part on the DL resource grant.

Aspect 58: An apparatus for wireless communication at a device, comprising a processor; memory coupled with the processor; and instructions stored in the memory and executable by the processor to cause the apparatus to perform the method of one or more of Aspects 1-38.

Aspect 59: An apparatus for wireless communication at a device, comprising a processor; memory coupled with the processor; and instructions stored in the memory and executable by the processor to cause the apparatus to perform the method of one or more of Aspects 39-57.

Aspect 60: A device for wireless communication, comprising a memory and one or more processors coupled to the memory, the one or more processors configured to perform the method of one or more of Aspects 1-38.

Aspect 61: A device for wireless communication, comprising a memory and one or more processors coupled to the memory, the one or more processors configured to perform the method of one or more of Aspects 39-57.

Aspect 62: An apparatus for wireless communication, comprising at least one means for performing the method of one or more of Aspects 1-38.

Aspect 63: An apparatus for wireless communication, comprising at least one means for performing the method of one or more of Aspects 39-57.

Aspect 64: A non-transitory computer-readable medium storing code for wireless communication, the code comprising instructions executable by a processor to perform the method of one or more of Aspects 1-38.

Aspect 65: A non-transitory computer-readable medium storing code for wireless communication, the code comprising instructions executable by a processor to perform the method of one or more of Aspects 39-57.

Aspect 66: A non-transitory computer-readable medium storing a set of instructions for wireless communication, the set of instructions comprising one or more instructions that, when executed by one or more processors of a device, cause the device to perform the method of one or more of Aspects 1-38.

Aspect 67: A non-transitory computer-readable medium storing a set of instructions for wireless communication, the set of instructions comprising one or more instructions that, when executed by one or more processors of a device, cause the device to perform the method of one or more of Aspects 39-57.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, which are configured, individually or in any combination, to:

receive a first indication to use, for a first wireless communication, an active downlink (DL) bandwidth part (BWP); and receive a second indication to use, for a second wireless communication, a restricted DL bandwidth (BW) that is based at least in part on the active DL BWP, wherein a size of the restricted DL BW is smaller than a size of the active DL BWP, and wherein the size of the restricted DL BW is equal to a BW size of a control resource set (CORESET) indicated by a UE-specific physical downlink control channel (PDCCH) monitoring configuration.

2. The apparatus of claim 1, wherein the one or more processors, to receive the second indication, are configured to:

receive an instruction to operate in a network energy saving mode; and operate in the network energy saving mode based at least in part on switching from using, for receiving one or more downlink communications, the active DL BWP to the restricted DL BW.

3. The apparatus of claim 1, wherein the one or more processors are further configured to:

receive, prior to the second indication to use the restricted DL BW, the UE-specific PDCCH monitoring configuration; and determine the restricted DL BW based at least in part on the CORESET, wherein the CORESET is one CORESET of multiple CORESETs indicated by the PDCCH monitoring configuration.

4. The apparatus of claim 3, wherein the one or more processors are further configured to:

select the CORESET from the multiple CORESETs based at least in part on a CORESET identifier (ID) associated with the CORESET.

5. The apparatus of claim 3, wherein the one or more processors are further configured to:

select the CORESET from the multiple CORESETs based at least in part on a resource block (RB) index associated with the CORESET.

6. The apparatus of claim 1, wherein the one or more processors are further configured to:

receive a BW size indication associated with the size of the restricted DL BW.

7. The apparatus of claim 1, wherein the one or more processors are further configured to:

determine, while operating in a network energy saving mode, a channel state information reference signal (CSI-RS) configuration based at least in part on the restricted DL BW.

8. The apparatus of claim 1, wherein the one or more processors are further configured to:

receive a DL resource grant that is based at least in part on the restricted DL BW; and validate, while operating in a network energy saving mode, that a frequency domain resource assignment associated with the DL resource grant is within the restricted DL BW.

9. The apparatus of claim 1, wherein the one or more processors are further configured to:

receive a semi-persistent scheduling (SPS) physical downlink shared channel (PDSCH) grant;

validate an occasion of the SPS PDSCH grant based at least in part on operating in a network energy saving mode; and determine whether to receive a PDSCH transmission in the occasion based at least in part on whether the occasion is validated.

10. The apparatus of claim 1, wherein the one or more processors are further configured to:

receive a semi-persistent scheduling (SPS) physical downlink shared channel (PDSCH) grant; and receive, while operating in a network energy saving mode, an entirety of a PDSCH transmission independently of whether at least one occasion resource of the SPS PDSCH grant is outside of the restricted DL BW.

11. The apparatus of claim 1, wherein the one or more processors are further configured to:

generate, while operating in a network energy saving mode, a radio resource management (RRM) measurement metric based at least in part on a reference signal.

12. The apparatus of claim 11, wherein the one or more processors are further configured to:

receive the reference signal based at least in part on at least one resource that is outside of the restricted DL BW, wherein generating the RRM measurement metric is based at least in part on the at least one resource that is outside of the restricted DL BW.

13. The apparatus of claim 11, wherein the one or more processors are further configured to:

receive the reference signal in at least one resource that is outside of the restricted DL BW, wherein the one or more processors, to generate the RRM measurement metric, are configured to:

generate the RRM measurement metric based at least in part on excluding a portion of the reference signal that is in the at least one resource that is outside of the restricted DL BW from an RRM measurement associated with generating the RRM measurement metric.

14. An apparatus for wireless communication at a network node, comprising:

one or more memories; and one or more processors, coupled to the one or more memories, which are configured, individually or in any combination, to:

transmit a first indication to use, for a first wireless communication associated with a user equipment (UE), an active downlink (DL) bandwidth part (BWP); and transmit a second indication to use, for a second wireless communication associated with the UE, a restricted DL bandwidth (BW) that is based at least in part on the active DL BWP, wherein a size of the restricted DL BW is smaller than a size of the active DL BWP, and wherein the size of the restricted DL BW is equal to a BW size of a control resource set (CORESET) indicated by a UE-specific physical downlink control channel (PDCCH) monitoring configuration.

15. The apparatus of claim 14, wherein the restricted DL BW is a sub-portion of the active DL BWP.

16. The apparatus of claim 14, wherein the one or more processors are further configured to:

transmit, prior to the second indication to use the restricted DL BW, the UE-specific PDCCH monitoring configuration, wherein the CORESET is one CORESET of multiple CORESETs indicated by the PDCCH monitoring configuration.

17. The apparatus of claim 16, wherein the one or more processors are further configured to:

indicate to select the CORESET from the multiple CORE-SETs based at least in part on a CORESET identifier (ID) associated with the CORESET.

18. The apparatus of claim 16, wherein the the one or more processors are further configured to:

indicate to select the CORESET from the multiple CORE-SETs based at least in part on a resource block (RB) index associated with the CORESET.

19. The apparatus of claim 14, wherein the one or more processors are further configured to:

transmit a BW size indication associated with the size of the restricted DL BW.

20. The apparatus of claim 14, wherein the one or more processors are further configured to:

indicate a DL resource grant that is based at least in part on the restricted DL BW.

21. The apparatus of claim 20, wherein the DL resource grant is within the restricted DL BW.

22. The apparatus of claim 20, wherein the one or more processors are further configured to:

transmit, as the second wireless communication, a physical downlink shared channel communication based at least in part on the DL resource grant.

23. A method of wireless communication performed by a user equipment (UE), comprising:

receiving a first indication to use, for a first wireless communication, an active downlink (DL) bandwidth part (BWP); and receiving a second indication to use, for a second wireless communication, a restricted DL bandwidth (BW) that is based at least in part on the active DL BWP, wherein a size of the restricted DL BW is smaller than a size of the active DL BWP, and wherein the size of the restricted DL BW is equal to a BW size of a control resource set (CORESET) indicated by a UE-specific physical downlink control channel (PDCCH) monitoring configuration.

24. The method of claim 23, further comprising:

generating, while operating in a network energy saving mode, a radio link management (RLM) measurement metric based at least in part on a reference signal.

25. The method of claim 24, wherein the reference signal is a synchronization signal block (SSB), and the method further comprises:

receiving at least a portion of the SSB in at least one resource that is outside of the restricted DL BW, wherein generating the RLM measurement metric is based at least in part on including the at least the portion of the SSB in the at least one resource that is outside of the restricted DL BW in an RLM measurement associated with generating the RLM measurement metric.

26. The method of claim 24, wherein the reference signal is a channel state information reference signal (CSI-RS), and the method further comprises:

receiving at least a portion of the CSI-RS in at least one resource that is outside of the restricted DL BW, wherein generating the RLM measurement metric comprises:

generating the RLM measurement metric based at least in part on excluding the at least the portion of the CSI-RS that is in the at least one resource that is outside of the restricted DL BW in an RLM measurement associated with generating the RLM measurement metric.

27. The method of claim 24, wherein the reference signal is a channel state information reference signal (CSI-RS), and the method further comprises:

receiving at least a portion of the CSI-RS in at least one resource that is outside of the restricted DL BW, wherein generating the RLM measurement metric comprises:

generating the RLM measurement metric based at least in part on including the at least the portion of the CSI-RS that is in the at least one resource that is outside of the restricted DL BW in an RLM measurement associated with generating the RLM measurement metric.

28. A method of wireless communication performed by a network node, comprising:

transmitting a first indication to use, for a first wireless communication associated with a user equipment (UE), an active downlink (DL) bandwidth part (BWP); and transmitting a second indication to use, for a second wireless communication associated with the UE, a restricted DL bandwidth (BW) that is based at least in part on the active DL BWP, wherein a size of the restricted DL BW is smaller than a size of the active DL BWP, and wherein the size of the restricted DL BW is equal to a BW size of a control resource set (CORESET) indicated by a UE-specific physical downlink control channel (PDCCH) monitoring configuration.

29. The method of claim 28, further comprising:

transmitting, prior to the second indication to use the restricted DL BW, the UE-specific PDCCH monitoring configuration, wherein the the CORESET is one CORESET of multiple CORESETs indicated by the PDCCH monitoring configuration.

30. The method of claim 29, further comprising:

indicating at least one restricted DL BW configuration parameter in the UE-specific PDCCH monitoring configuration.

* * * * *